United States Patent [19]

Yoshida

[11] 4,397,719

[45] Aug. 9, 1983

[54] PROCESS FOR PREPARING NITROGEN BY AMMONIUM NITRATE DECOMPOSITION

[75] Inventor: Mitsuo Yoshida, Nobeoka, Japan

[73] Assignees: Asahi Kasei Kogyo Kabushiki Kaisha, Osaka; Doryokuro Kakunenryo Kaihatsu Jigyodan, Tokyo, both of Japan

[21] Appl. No.: 302,129

[22] Filed: Sep. 14, 1981

Related U.S. Application Data

[62] Division of Ser. No. 81,897, Oct. 4, 1979, Pat. No. 4,312,722.

[30] Foreign Application Priority Data

Oct. 6, 1978 [JP] Japan ............................. 53-122736
Oct. 6, 1978 [JP] Japan ............................. 53-122737

[51] Int. Cl.³ .................... C25B 1/00; C25B 9/00; C25B 15/08; C01B 21/00
[52] U.S. Cl. .................................... 204/91; 204/102; 204/238; 204/264; 204/296; 423/351
[58] Field of Search .............. 204/91, 102, 237–238, 204/252, 264, 296; 423/351

[56] References Cited

U.S. PATENT DOCUMENTS

| | | | |
|---|---|---|---|
| 791,194 | 5/1905 | Hoopes | 204/102 |
| 1,359,002 | 11/1920 | Thomas | 204/264 |
| 2,273,799 | 2/1942 | Janes et al. | 204/91 |
| 2,601,221 | 6/1952 | Rosenblatt et al. | 423/351 X |
| 3,103,473 | 9/1963 | Juda | 204/91 X |
| 3,278,403 | 10/1966 | Gardella et al. | 204/91 |
| 3,413,203 | 11/1968 | MacLean | 204/91 |

Primary Examiner—Donald R. Valentine
Attorney, Agent, or Firm—Birch, Stewart, Kolasch & Birch

[57] ABSTRACT

Nitrates, such as alkali metal nitrates and ammonium nitrate, are electrolytically reduced to the corresponding nitrites by a process wherein an aqueous solution containing a nitrate is supplied into a cathode chamber of an electrolytic cell including cathode and anode chambers separated by a cation exchange membrane and an electric current is applied to the electrolytic cell, while maintaining the pH of the aqueous solution at a value of at least about 4. This process can be advantageously applied not only to the manufacture of nitrites but, also, to the treatment of waste nitrates. In the treatment of waste ammonium nitrate, the ammonium nitrite so formed is conveniently further treated by subjecting the electrolytically reduced catholyte to thermal decomposition outside the electrolytic cell, and removing the so formed nitrogen and water from the reaction system.

18 Claims, 3 Drawing Figures

PROCESS FOR PREPARING NITROGEN BY AMMONIUM NITRATE DECOMPOSITION

This application is a divisional of copending application Ser. No. 081,897, filed on Oct. 4, 1979 now U.S. Pat. No. 4,312,722.

BACKGROUND OF THE INVENTION

(1) Field of the Invention

The present invention relates to a process for the preparation of nitrites. More particularly, the invention relates to a process for preparing an alkali metal nitrite or ammonium nitrite by electrolytic reduction of an aqueous solution containing a nitrate of an alkali metal, such as sodium nitrate, potassium nitrate or ammonium nitrate.

(2) Description of the Prior Art

Conventional processes for preparing nitrites will now be described by reference to the production of sodium nitrite as a typical instance of the nitrite. According to one known process, sodium nitrate is reduced by lead, whereby sodium nitrite is formed by the reaction represented by the formula:

$$NaNO_3 + Pb = NaNO_2 + PbO.$$

According to another known process, gaseous nitrogen oxide is absorbed in a solution of sodium hydroxide or sodium carbonate, whereby sodium nitrite is formed by the reaction represented by the formula:

$$Na_2CO_3 + 2NO + \tfrac{1}{2}O_2 = 2NaNO_2 + CO_2.$$

In the process using lead as the reducing agent, in order to remove lead incorporated in sodium nitrite, crystallization should be repeated several times. The process using gaseous nitrogen oxide is defective in that, if the absorbing liquid is acidic, nitrous acid and nitric acid are formed as by-products.

The inventors conducted research with a view to developing a process in which nitrites can advantageously be prepared industrially and found that, when an aqueous solution containing a nitrate is subjected to electrolytic reduction under specific conditions, the corresponding nitrite can advantageously be prepared industrially.

It is known that electrolytic reduction of nitrate ions is difficult to effect under ordinary electrolysis conditions. For example, in "LES REACTIONS ELECTROCHIMIQUES METHODS ELECTROCHIMIQUES D'ANALYSE," G. Charlot states that on a mercury electrode, direct reduction of nitrate and nitrite ions is very slow and is caused only at an electric potential which is approximately that at which supporting electrolytes are reduced, that is, in a solution containing $Na^+$ or $K^+$ ions, nitrate and nitrite ions are not electrically active. In short, G. Charlot feels that electrolytic reduction of nitrates is difficult.

Electrolytic reduction of an aqueous solution containing ammonium nitrate has been attempted on a laboratory scale. For example, in Research Group Report AERE-R4393(1963), of the U.K. Atomic Energy Authority, it is taught that ammonium nitrate can be decomposed to nitrogen and water according to reactions represented by the formulae (1) and (2):

$$NH_4NO_3 + 2e + 2H^+ \rightarrow NH_4NO_2 + H_2O \quad (1)$$

$$NH_4NO_2 \rightarrow N_2 + 2H_2O \quad (2)$$

In this reference, results of experiments conducted for finding conditions enabling decomposition of ammonium nitrate to nitrogen and water at temperatures approximating the boiling point are disclosed. In this reference, it is concluded that in the electrolytic reduction of the formula (1), the pH of the catholyte is gradually elevated with the advance of the electrolysis and the current efficiency is reduced substantially to zero if the catholyte is neutral or alkaline, and therefore, it is necessary to maintain the pH of the catholyte not higher than 1 during the electrolysis.

Japanese Patent Laid-Open Application No. 56375/75 discloses a process for the electrolytic reduction of an aqueous solution containing ammonium nitrate. This process is characterized by no use of a permeable membrane, and as clearly described in the specification of this application, the production of nitrites is not intended and conditions for preparing nitrites are not disclosed at all.

SUMMARY OF THE INVENTION

It is a primary object of the present invention to provide a process in which an alkali metal nitrite or ammonium nitrite can be selectively and stably formed while maintaining a high current efficiency and reducing the formation of by-products, such as $NO_x$, $H_2$, $NH_3$ and $N_2$, on the cathode to as low a level as possible.

Another object of the present invention is to provide a process in which waste nitrates formed in the process using nitric acid as a solvent, such as the surface treatment in the metal industry or the nuclear fuel treatment, can be treated at a high efficiency.

More specifically, in accordance with the present invention, there is provided a process for the preparation of nitrites, comprising supplying an aqueous solution containing a nitrate into a cathode chamber of an electrolytic cell including cathode and anode chambers separated by an ion exchange membrane and applying an electric current to the electrolytic cell while maintaining the pH of the aqueous solution above 4.

DETAILED DESCRIPTION OF THE PREFERRED EMBODIMENTS

Figure 1:
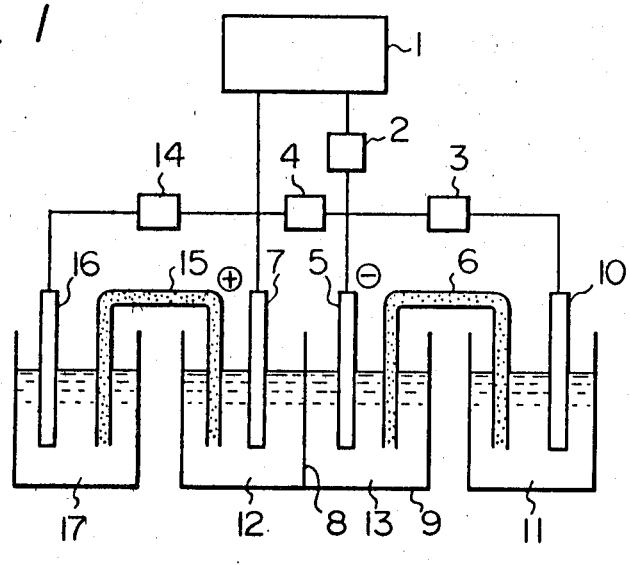
FIG. 1 is a circuit diagram illustrating the measurement device that is used for obtaining a current-potential curve on selection of a cathode.

The pH value of an aqueous solution of a nitrate, that is used as the starting material in the present invention, is in the range of from about 4 to about 5, unless the concentration is extraordinarily high or low. When this aqueous solution is introduced into a cathode chamber of an electrolytic cell and a mineral acid is introduced into an anode chamber of the electrolytic cell, the mineral acid is diffused through a cation exchange membrane. Accordingly, the pH of the aqueous solution of the nitrate is reduced. If an acid is contained in this aqueous solution, the pH of the aqueous solution should naturally be reduced below about 4. However, when application of an electric current to the electrolytic cell is commenced, the pH value of the aqueous solution is elevated by formation of an alkali metal hydroxide or dissociation of ammonium hydroxide, as represented by the formulae:

$$NaNO_3 + 9H^+ + 8e \rightarrow NH_4^+ + NaOH + 2H_2O \quad (3)$$

$$NaNO_2 + 7H^+ + 6e \rightarrow NH_4^+ + NaOH + H_2O \quad (4)$$

The reactions of the formulae (3) and (4) are very vigorous when the pH value is below about 4. In each of the reactions of the formulae (3) and (4), in order to perform the electrolytic reduction while maintaining the pH value below a certain level, it is necessary to conduct the electrolytic reduction while adding an acid such as nitric acid. For example, in experiments described in the above-mentioned Report AERE-R4393, ammonium nitrate is electrolytically reduced to ammonium nitrite, and it is simultaneously converted to nitrogen and water by thermal decomposition, and it is taught in this report that it is necessary to maintain highly acidic conditions exceeding at least about 0.5 M concentration. It also is taught that under neutral or alkaline conditions, the current efficiency is reduced substantially to zero and hydrogen alone is formed. However, addition of an acid, for example, nitric acid, results in an increase in the amount of the substance to be electrolytically reduced, contrary to the objects of the present invention, and this method is not advantageous from the economical viewpoint. Accordingly, a process not comprising addition of an acid is preferred from the economical viewpoint. One of the characteristic features of the present invention is that a nitrate is electrolytically reduced, while maintaining the pH value at a level of at least about 4, or from about 4 to about 10, preferably at least about 7, without addition of an acid or by adding a minute amount of an acid.

In some cases, the pH of the catholyte is limited depending upon the composition of the cathode material used. For example, if lead is used as the cathode material, it is preferred from the practical viewpoint that the ph value of the catholyte be about 7 or more. Moreover, when ammonium nitrate is electrolytically reduced, it is preferred that the pH value of the aqueous solution of ammonium nitrate be adjusted within the range of from about 7 to about 10.

It is preferred that the electrolytic reduction be carried out at a temperature of about 5° to about 95° C., particularly about 15° to about 70° C. With an increase of the temperature, side reactions for forming by-products, such as ammonia and nitrogen monoxide, become vigorous, and the current efficiency for formation of the intended nitrite is accordingly reduced.

The concentration of the aqueous solution of the nitrate that is used in the present invention is not particularly critical, as long as the aqueous solution retains a stable state. Generally, the concentration is selected in the range of from about 1% to about 50% by weight, while taking into account the viscosity and conductivity of the solution, and the electrolysis efficiency. Aqueous solutions containing compounds such as heavy metal salts and ions in addition to the nitrate can be conveniently reduced as long as these impurities have no bad influences on the electrolysis.

In the process of the present invention, it is observed that oxygen gas is generated in the anode chamber in an electrochemically stoichiometric quantity according to the current applied. In order to maintain the conductivity within an appropriate range and facilitate the supply of protons to the cathode chamber, it is preferred to use an aqueous solution of a mineral acid, such as nitric acid, sulfuric acid, hydrochloric acid or other hydrohalogenic acid, as the anolyte. If the composition of the catholyte and formation of a gaseous by-product on the anode are taken into account, nitric acid is especially preferred as the mineral acid. The molar concentration of the mineral acid as the anolyte is ordinarily adjusted in the range of from about 0.1 to about 2 M. The appropriate concentration is determined after due consideration of influences of the liquid resistance on the electrolytic cell voltage, the specific conductivity, the corrosion resistance of the electrode and the durability of the ion exchange membrane.

An ion exchange membrane having a sufficient corrosion resistance against the mineral acid and formed oxygen is used as the ion exchange membrane separating the electrolytic cell into the cathode and anode chambers. For example, there can be used cation exchange membranes composed of styrene/divinylbenzene copolymers having sulfonic acid or carboxylic acid groups introduced therein as exchanging groups, and ion exchange membranes composed of sulfonation products of chemically stable polymers, such as divinylbenzene/acrylic acid copolymers and homopolymers, and copolymers of ethylene. Generally, it is preferred that these membranes be used in the state reinforced by synthetic fibers or glass fibers.

An ion exchange membrane composed of a fluorine-containing polymer is especially preferred because it can be used stably for a very long time. For example, there are preferably employed fluorine-containing copolymers containing pendant type sulfonic acid groups or derivatives thereof and having recurring units represented by the formulae:

wherein R stands for a group represented by the formula

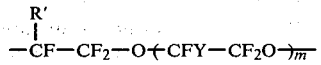

in which R' stands for a fluorine atom or a perfluoroalkyl group having 1 to 10 carbon atoms, Y stands for a fluorine atom or a trifluoromethyl group and m is 1, 2 or 3, n is 0 or 1, X stands for a fluorine, chlorine or hydrogen atom or a trifluoromethyl group, and X' is the same as X or a group

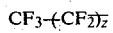

in which Z is 0 or an integer of from 1 to 5. In the fluorine-containing copolymers of this type, it is preferred that the recurring units of the formula (I) be present in an amount of 3 to 20 mol %. The process for preparing membranes of these copolymers is described in detail in the specification of U.S. Pat. No. 3,282,875, and these membranes are marketed under the tradename "Nafion membrane" by Du Pont, U.S.A. Furthermore, there may be used various fluorinated copolymers having weakly acidic functional groups as ion exchanging groups. For example, there can be mentioned ion exchange membranes composed of fluorinated copolymers having at least one functional group selected from carboxylic acid, phosphonic acid and phosphoric acid groups, and derivatives thereof, which is stably bonded to the main chain or side chain, such as copolymers having ion exchanging groups of the $OCF_2$-COOM type, which are disclosed in U.S. Pat. No. 4,151,053, and copolymers having ion exchanging groups of the

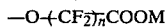

type, which are disclosed in Japanese Patent Laid-Open Application No. 48598/77. It is preferred that these ion exchanging groups be present in laminar form on the surface of the membrane, though applicable membranes are not limited to such membrane. Still further, there may be used a membrane of the amide type formed by reacting a diamine or polyamine with a fluorinated copolymer, which is disclosed in U.S. Pat. Nos. 3,969,285; 4,026,783; and 4,030,988, a membrane of a fluorinated copolymer of the sulfonamide type, which is disclosed in U.S. Pat. No. 3,784,399 and a membrane composed of a fluorinated copolymer having N-monosubstituted sulfonamide groups, which is disclosed in British Pat. No. 1,484,611. When ion exchange membranes having amide groups or weakly acidic groups are employed, it is necessary to adjust the acid concentrations in both the catholyte and anolyte so as to set up such conditions as will not cause degradation of the membranes.

These cation exchange membranes exert functions of separating the catholyte and anolyte by defining the cathode and anode chambers, supplying protons to the cathode chamber while preventing re-oxidation in the anode, and separating gases generated in both the chambers. If a partition plate composed of a diaphragm or porous plate, having no ion exchange capacity, is employed, the foregoing functions cannot be sufficiently exerted and no econmical advantage is attained by electrolytic reduction. When an anion exchange membrane is used, since nitrate and hydroxide ions are permeated to the anode chamber, reduction to the nitrite cannot be accomplished at a high efficiency.

In the present invention, a known corrosion-resistant anode material can be used. For example, there may be used anodes composed of platinum group metals, anodes formed by coating one platinum group metal or an alloy of at least two platinum group metals on the surface of a corrosion-resistant metal, such as titanium, tantalum, zirconium or niobium, and anodes formed by coating a mixture or mixed crystal (solid solution) of a platinum group metal and a corrosion-resistant metal on the surface of the above-mentioned corrosion-resistant metal. An anode containing iridium as the platinum group metal at a ratio higher than the ratios of other metals is especially preferred.

In the present invention, in order to obtain the nitrite at a high current efficiency, it is important to select a cathode in which generation of hydrogen is reduced. Noble metals, such as platinum, are excellent in the corrosion resistance, but since the overpotential of hydrogen is low and generation of hydrogen is vigorous, the current efficiency for formation of the nitrite is very low. When iron, stainless steel, titanium and carbon are used, generation of hydrogen is observed, but the nitrite can be formed at a higher efficiency than in the case of platinum.

A cathode composed of mercury, indium, cadmium, zinc, lead or tin, or an alloy of at least two of these metals, or an alloy of such metal with another metal, is preferred because the nitrite can be obtained at an enhanced current efficiency. From current-potential curves, it was confirmed that in such cathode material, there is an especially great difference between the potential for generation of hydrogen and the potential for reducing nitrate ions to nitrite ions. The measurement results of these current-potential curves are completely in agreement with results of the actual electrolytic reduction. The measurement of current-potential curves was carried out by using a measurement device illustrated in FIG. 1. More specifically, an anolyte 12 and a catholyte 13 are introduced into two chambers of an electrolytic cell 9 partitioned by a cation exchange membrane 8, and; an anode 7 and a cathode 5 are inserted into these chambers, respectively, and they are connected to a direct current source 1 through an ammeter 2. The cathode potential and anode potential are measured by using reference electrodes 10 and 16 inserted in saturated potassium chloride solutions 11 and 17, respectively, which solutions 11 and 17 are connected to the respective chambers through salt bridges 6 and 15, respectively, and by using potentiometers 3 and 14 located between every adjacent electrode and reference electrode. The potential difference between the anode 7 and cathode 5 is measured by a potentiometer 4 located between the anode 7 and cathode 5. For example, a calomel electrode for a pH meter is used as the reference electrode. The potential for reduction to the nitrite ion in the corresponding composition of the catholyte is measured under conditions to be actually adopted for the electrolytic reduction, while changing the electric current. Conditions very close to the actual electrolytic conditions can be set up and behaviors can be examined while changing optionally the compositions of the anode, anolyte, cathode and catholyte. It is difficult to measure the hydrogen-generating potential of the cathode to be examined, because reduction to nitrite ions preferentially occurs in the aqueous solution of the nitrate. Accordingly, an aqueous solution of a hydrochloride containing the same alkali metal or ammonium is used as the reference solution and the hydrogen-generating potential is measured by using the same cathode. Common electrochemical conditions are employed as much as possible in the respective experiments. It was found that, as the potential difference observed at the same current in the so obtained two current-potential curves is large, generation of hydrogen is reduced and the current efficiency for generation of the nitrite is high. This potential difference varies to some extent depending on the composition and pH of the anolyte, that is, the composition of the aqueous solution of the nitrate to be electrolytically reduced, and therefore, the value of this potential difference cannot be specifically described. However, when the measurement is carried out by using a catholyte containing a sodium nitrate solution at a molar concentration of 2.7, and having a pH value of 9, and an anolyte containing a 0.5 M nitric acid solution, the potential difference ΔV at a current of 1 A (current density=7 A/dm$^2$) is 0.68 V in the case of Pb, 0.30 V in the case of Sn, 0.44 V in the case of Cd, 0.68 V in the case of zinc, 0.73 V in the case of In and 0.32 V in the case of Pb(90)—CU(10) alloy and 0.32 V in the case of Cu. When the measurement is carried out under the same conditions for a Pt cathode, the potential difference is −0.20 V. In order to perform the electrolytic reduction without generation of hydrogen, it is generally necessary to use a cathode characterized by a potential difference ΔV of at least about 0 V, preferably at least about 0.1 V. The potential difference of mercury had to be measured by using a special electrolytic cell. It was found that mercury provides the largest ΔV value. Each of the cathodes of mercury, cadmium, zinc, indium, lead and tin provides a ΔV value of at least 0.1 V. An appropriate cathode material is selected from these metals according to the kind of nitrate and the pH value of the nitrate solution. For example, since cadmium and zinc are exceptionally easily dissolved in an aqueous solution of ammonium nitrate, they cannot be used in the elementary form. Furthermore, each metal has a preferred stable pH range. For example, a pH value of about 7 to about 13 is preferred for lead and a pH value of about 2 to about 13 is preferred for tin. Accordingly, it is important to select an appropriate cathode material depending on the pH value of the catholyte to be electrolyzed. In order to effectively use cathodes of these metals as industrial electrodes, and improve the mechanical strength and corrosion resistance, minute amounts of other metals may be incorporated in these cathode materials. For example, minute amounts of antimony, silver, copper and selenium may be incorporated. The amount and kind of such additive metal should be selected so that a decrease in the difference between the potential for the reduction reaction and the potential for generation of hydrogen can be substantially avoided, and the ΔV value can be maintained at a level of at least about 0.1 V.

The shapes of the anode and cathode are optionally determined according to the shape or structure of the electrolytic cell. For example, perforated plates, porous plates, net plates, plain plates or cylinders may be used. If an electrode of a perforated or expanded mesh plate is employed, the amount used of an expensive valve metal as a core metal can be reduced, and further, there can be attained an advantage that both the back and side faces of the plate can be effectively used as the electrode surface. When mercury is used as the cathode, a method can be effectively adopted in which an anode and an anode chamber are arranged in parallel to the plane formed by mercury.

A multi-electrode type electrolytic cell having a structure capable of clamping and supporting an ion exchange membrane therein is preferably used as the electrolytic cell in the present invention. As the material of the electrolytic cell, there can be mentioned corrosion-resistant metals, polyvinyl chloride resins, polypropylene resins, polyethylene resins, fluorine-containing polymer resins and other corrosion resistant plastics. An electrolytic cell disclosed in U.S. Pat. No. 4,111,779, which is formed of a material prepared by explosive clad of titanium alloys and stainless steel, having a corrosion resistance against the catholyte and anolyte, and hot-rolling the bonded metals, is especially preferred. In this multi-electrode type electrolytic cell, gases generated escape to the back of the electrodes and shielding of the current by the generated gases can be prevented. Furthermore, since the ohmic drop can be reduced by minimizing the distance between electrodes, the low electrolysis voltage can be obtained and the unit of the power consumption can be decreased.

The electrolytic process of the present invention will now be described in detail with reference to FIG. 2.

Figure 2:
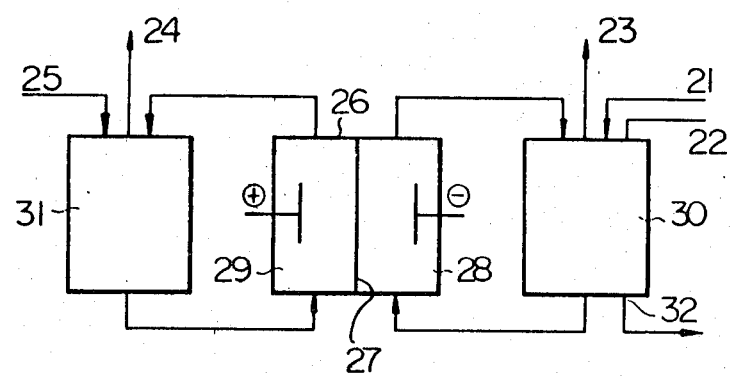
FIG. 2 is a diagram illustrating the electrolytic system that is used for practicing the electrolytic reduction according to the present invention.

An aqueous solution containing a nitrate, in which the pH value and nitrate concentration have been adjusted in advance, is introduced into an electrolytic reduction system illustrated in FIG. 2 from a nitrate solution supply opening 21 through a catholyte tank 30. A catholyte in the catholyte tank 30 is fed to a cathode chamber 28 of an electrolytic cell 26 at a predetermined feed rate by a pump. The catholyte containing the formed nitrite and unreduced nitrate is returned to the catholyte tank 30 from the cathode chamber 28. At this point, minute amounts of gases formed by side reactions, such as $N_2$, $H_2$ and NO, are discharged into the open air from a cathode gas outlet 23 through a gas-liquid separator, mist separator or trap (not shown). By repeating the above mentioned procedures, the concentration of the nitrite in the catholyte can be gradually increased. When the nitrite concentration reaches a predetermined level, the catholyte is taken out from the reduction system through a discharge opening 32, and fed to the subsequent steps where such operations as concentration, separation and decomposition are conducted. Generally, the nitrite concentration in the catholyte is continuously measured and recorded by a photospectrometer (not shown). Furthermore, the pH value of the catholyte is continuously measured by a pH meter (not shown). When maintenance of the predetermined electrolysis conditions becomes impossible due to the influences of the formed ammonium hydroxide, nitric acid is supplied from a nitric acid supply inlet 22 to adjust the pH value.

The electrolytic cell 26 is separated into the cathode chamber 28 and an anode chamber 29 by a cation exchange membrane 27. An aqueous solution of a mineral acid is used as the anolyte and is recycled between an anolyte tank 31 and the anode chamber 29 by means of a pump (not shown). Oxygen gas formed in the anode chamber 29 is discharged from the reduction system through an anode gas outlet 24. A part of the water in the anolyte is permeated to the cathode chamber 28 through the cation exchange membrane 27 with migration of protons from the anode chamber 29 to the cathode chamber 28. A water supply inlet 25 is provided to supply water to compensate for the so permeated water.

It is preferred that the electrolysis be carried out while pH, temperature, flow rate and current density conditions are maintained at optimum levels. There can be adopted a method in which the electrolysis is conducted by recycling the catholyte until the concentration of the nitrite reaches a predetermined level and a method in which the electrolysis is carried out by continuously withdrawing the catholyte containing the nitrite while continuously feeding an aqueous solution of the nitrate at a predetermined rate.

As will be apparent from the foregoing illustration, according to the present invention, nitrates can advantageously be converted to nitrites industrially. Therefore, the present invention can be advantageously applied to the manufacture of nitrites as industrial chemicals. Moreover, the present invention can be effectively applied to the treatment of waste nitrates formed in processes using nitric acid as a solvent, such as the surface treatment in the metal industry and nuclear fuel treatment.

More specifically, the process of the present invention can be effectively applied to: the treatment of a solution formed by treating nitrogen oxides and then washing the treated solution with aqueous ammonia; the treatment of a liquid formed when a nitrate is hydrolyzed by ammonia; the treatment of a liquid formed by neutralizing nitric acid used for dissolution of metals by ammonia, and; the treatment of an aqueous solution containing ammonium nitrate, which is formed in the step of the nuclear fuel treatment. The present invention is valuable also from the point of view that the above-mentioned processes prevent environmental pollution. When the process of the present invention is applied to the above-mentioned treatment, ammonium nitrate is converted to ammonium nitrite and the formed ammonium nitrite is decomposed to nitrogen and water. This embodiment will now be described in detail.

The reaction of thermally decomposing ammonium nitrite to nitrogen and water is known. On page 600, chapter 13, of "Inorganic Chemistry," written by Toshizo Chitani, as an instance of the processes for preparing pure chemical nitrogen, a process utilizing the following reaction is described.

$$NH_4NO_2 \rightarrow N_2 + 2H_2O$$

In this reference, it is stated that, when a concentrated aqueous solution of ammonium nitrate is heated at about 70° C., decomposition occurs.

Further, in the above-mentioned Research Group Report AERE-R4393, of the U.K. Atomic Energy Authority, there is described a process in which ammonium nitrate is electrolytically reduced to ammonium nitrite, the ammonium nitrite formed is immediately thermally decomposed to nitrogen and water in the same cell, and nitrogen gas is discharged. The reaction per se of decomposition of ammonium nitrite is known, but this method has not been industrially used. The reason for this is that this method is very unstable and no particular device is made for the industrial production using this method. As typical defects of this method, the following defects can be mentioned. In the first place, since it is indispensable to perform the electrolytic reduction at a pH value of not higher than 1, in order to maintain such a strongly acidic state, it is necessary to continuously add a mineral acid, such as nitric acid, during the electrolysis, and selection of an appropriate cathode material is very difficult. In the second place, since the electrolysis is carried out at a temperature which is close to the boiling point of the aqueous solution, such by-products as $NO_x$ and $NH_3$ are formed by side reactions and an appropriate secondary treatment should be conducted for removing these by-products. Furthermore, relatively large quantities of electrons are consumed for formation of these by-products and the current efficiency is drastically reduced.

The inventors have found that, if the electrolytic reduction of ammonium nitrate and the thermal decomposition of ammonium nitrite are carried out in two stages, the above-mentioned known process can advantageously be conducted industrially.

More specifically, according to the present invention, a catholyte containing ammonium nitrite, which is prepared according to the above-mentioned electrolytic reduction process, is taken out from the electrolytic cell, and the catholyte is heated to effect thermal decomposition of ammonium nitrite. The decomposition product is removed from the resulting mixture, and the residual nitrate in the liquid is returned to the electrolytic cell and used for the electrolytic reduction. Finally, the majority of the ammonium nitrite is decomposed to nitrogen and water.

The concentration of the aqueous solution of ammonium nitrate is ordinarily chosen in the range of about 1 to about 50% by weight. The pH value of the catholyte is at least about 4 and preferably in the range of from about 7 to about 10. The pH value is adjusted by using aqueous ammonia. However, because of the state of dissociation of ammonium hydroxide in a solution of ammonium nitrate, it is difficult to increase the pH value to more than about 10. Ammonium nitrite is stable in an alkaline region, and when the pH value is higher than about 9, thermal decomposition of ammonium nitrite is only partially caused, even if the temperature is elevated to a level close to the boiling point (about 102° C., under atmospheric pressure, in the case of a 20% aqueous solution of ammonium nitrite). Accordingly, when the thermal decomposition is carried out on an industrial scale, adoption of the pH value included in the alkaline region is not preferred. On the other hand, if the pH value is lower than about 7, the thermal decomposition is conducted very smoothly.

As will be apparent from the foregoing illustration, a preferred pH range for formation of ammonium nitrite is quite different from a preferred pH range for decomposition of ammonium nitrite. Accordingly, special devices are required in order to conduct these two reactions in one continuous process.

As practically applicable embodiments, the following two methods can be mentioned.

(A) Batchwise Method:

The electrolytic reduction is continuously carried out for a certain time, and then, the catholyte is taken out from the electrolytic cell. After the pH value has been adjusted to a level suitable for thermal decomposition, the catholyte is fed to a thermal decomposition apparatus and is thermally decomposed in this apparatus. Nitrogen and water formed by the thermal decomposition are removed, and also, water permeating from the anode chamber and water to be used for adjusting the concentration of the solution of ammonium nitrate are removed. The residual aqueous solution containing unreduced ammonium nitrate is returned to the electrolytic cell after the pH value has been adjusted to a level suitable for the electrolytic reduction, and the returned solution and a newly supplied aqueous solution of ammonium nitrate are subjected to the electrolytic reduction.

Figure 3:
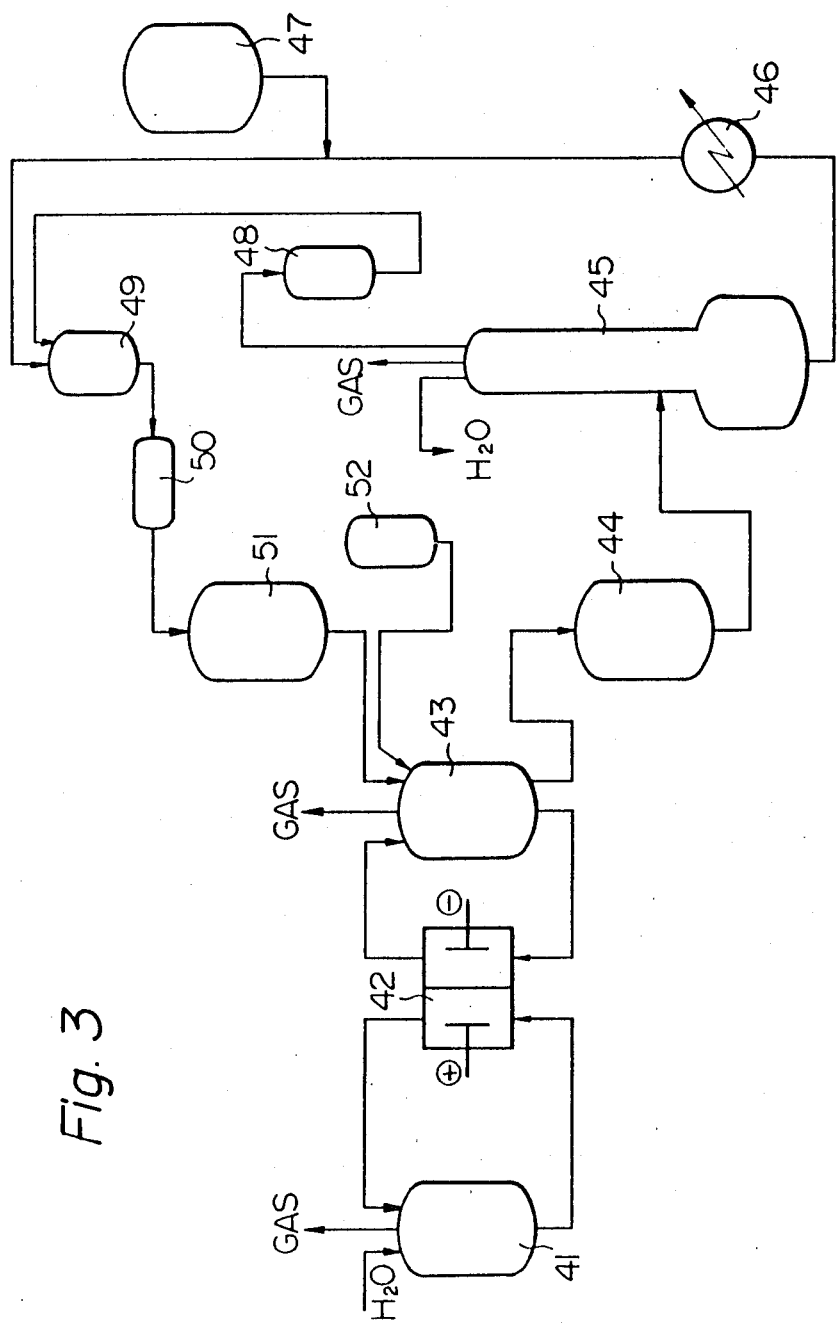
FIG. 3 is a flow sheet illustrating one embodiment of the electrolytic reduction of ammonium nitrate according to the present invention.

(B) Continuous Method:

The electrolytic reduction and the thermal decomposition are conducted by a continuous recycling process wherein a circuit system such as shown in FIG. 3, illustrated below, is utilized. It is possible and convenient in such a continuous recycling process for the electrolytic reduction and the thermal decomposition to be carried out at approximately the same pH value, which deviates from optimum pH ranges used in electrolytic reduction and thermal decomposition but is suitable for industrial production.

The treatment can be conducted according to either of the above-mentioned methods. When the treatment is carried out on an industrial scale, limitations imposed on the thermal decomposition speed, the material balance, the heating-cooling cycle, the process control and other factors should be carefully examined.

It is preferred that the thermal decomposition of an aqueous solution of ammonium nitrite be carried out at a temperature higher than the temperature adopted for the electrolytic reduction. However, it is possible to thermally decompose ammonium nitrite to nitrogen and water in the electrolytic cell. It was confirmed by the inventors of the present invention that partial decomposition is caused during the electrolytic reduction and nitrogen is formed. However, it is not preferred to conduct the electrolytic reduction at a temperature high enough to advance the thermal decomposition completely, because formation of by-product gases, such as NO and $NH_3$, is enhanced, resulting in a reduction of the current efficiency. Accordingly, it is generally preferred to perform the electrolytic reduction at an optimum temperature for the electrolytic reduction and to elevate the temperature to a level suitable for the thermal decomposition in the second stage.

At a solution pH value of about 7 and under atmospheric pressure, formation of $N_2$ by thermal decomposition is observed if the temperature is about 70° C. or higher, but in order to cause complete decomposition, it is necessary to heat the solution at a temperature higher than 85° C. If the temperature is elevated to the boiling point of the solution, the decomposition speed is remarkably increased.

Parts of ammonium hydroxide formed as a by-product during the electrolytic reduction and ammonium hydroxide added for the adjustment of the pH value can be recovered as ammonia in the condensed water. Accordingly, the pH value can be reduced to a level approximating the neutral point during the thermal decomposition. Incidentally, the so recovered ammonia can be used for adjusting the pH value of the catholyte at the step of the electrolytic reduction.

In short, in the above-mentioned embodiment, it is preferred that the electrolytic reduction be carried out at a temperature of from about 15° to about 70° C. and the thermal decomposition be carried out at a temperature of about 70° C. or higher.

Incidentally, the reaction of the second stage can be effectively promoted by a method in which decomposition is accomplished by continuing the heating under a pressure lower than the atmospheric pressure.

The inventors have found that the speed of the thermal decomposition can be effectively increased by using a certain catalyst. As a catalyst capable of providing good results, there can be mentioned catalysts containing about 2 to about 5% of at least one platinum group metal selected from platinum, ruthenium, rhodium, iridium and palladium supported on alumina or active carbon; granular active carbon; and porous activated alumina and zeolite catalysts.

In the above-mentioned continuous method (B), where both the electrolytic reduction and the thermal decomposition are carried out at substantially the same pH values and it is intended to reduce the amount of ammonium nitrate formed by the adjustment of the pH value or completely prevent formation of such ammonium nitrate, it is impossible to avoid conducting the thermal decomposition at a relatively low speed. Accordingly, if a catalyst such as mentioned above is used in this continuous method (B), an especially prominent effect of increasing the decomposition speed can be obtained. Also, in the batchwise method (A), the use of the catalyst is preferred because a high decomposition speed can be maintained at a relatively low decomposition temperature. In any event, the solution which has been subjected to the thermal decomposition by heating should be cooled and, then, returned to the electrolytic cell. Accordingly, the presence of an effective catalyst is preferred from the point of view of energy economy.

The process created through use of the catalyst has not been sufficiently elucidated. Generally, the catalyst shows a prominent effect when the thermal decomposition is carried out at a pH value included in the alkaline region, that is, a pH value of from about 8 to about 9. In the neutral or acidic pH region, the thermal decomposition is vigorously advanced, and therefore, no prominent effect can be attained by the use of the catalyst. It is often observed that, when the thermal decomposition is carried out in the alkaline pH region, the speed of the decomposition is drastically reduced when the thermal decomposition is advanced to a certain stage (for example, when the degree of decomposition arrives at a level of about 25 to about 30%). When the catalyst is added, this undesirable reduction of the decomposition speed can be effectively prevented and the thermal decomposition can be promoted until the degree of decomposition is elevated to approximately 100%.

The catalyst can be added to the reaction system by various methods. For example, the catalyst may be added to the thermal decomposition column and suspended in the solution contained in the column. Furthermore, there may be adopted a method in which a catalyst layer is formed in a pack-type column and the solution is passed through this catalyst layer.

A neutralization product formed by neutralizing nitric acid which has been used for the surface treatment of metals, the metal-dissolving treatment or the waste gas treatment, with ammonia or an ammonium nitrate solution formed in the nuclear fuel treatment, often contains metals in the form of compounds or ions dissolved or suspended therein. In order to prevent these impurities, such as metal ions, from having undesirable influences on the electrolytic reduction, it is preferred that these impurities be positively precipitated and removed as much a possible. If such separation operations as precipitation of metal hydroxides, growth of colloids and reduction of the solubility are carried out before the starting solution containing ammonium nitrate is fed to the electrolytic cell, or before the liquid left in the thermal decomposition column is recycled to the electrolytic cell after adjustment of the concentration and/or the pH value, considerable quantities of impurities can be separated and removed.

Devices customarily used in the chemical industry may be used for performing these precipitation, sedimentation and separation operations. Namely, appropriate devices are chosen from a continuous precipitating and concentrating device, a thickener, a continuous clarifying device of the countercurrent contact type, an accelerator, a centrifugal separator, a cake filtering device, a filter, a pressure filter and a vacuum filter according to the kinds and quantities of impurities to be removed.

When the substance to be removed is (1) a fine colloid, (2) a substance which does not tend to agglomerate and does not form coarse particles, (3) a substance to which a coagulant or precipitant cannot be applied or (4) a nuclear fuel, even separation of a minute amount of which involves problems, adoption of an ultrafiltration system yields especially good results in the present invention. For example, when an ultrafiltration system using a synthetic polymer membrane composed of polyacrylonitrile or an acrylonitrile copolymer (for example, a module composed of a membrance of the HXB type manufactured by Asahi Kasei Kogyo) is adopted, the majority of the colloidal particles of uranium, chromium, iron, etc., can be removed, as demonstrated in the Examples set forth hereinafter. The above-mentioned system has a very simple structure including a liquid reservoir tank, a pump, a pressure valve, a pressure gauge and a non-return valve, and this system is effectively used when the operation is carried out under such conditions that washing of the electrolytic cell, electrodes and ion exchange membrane is not allowed for a long period or when the electrolytic cell is continuously used for a long time. This embodiment will now be described in detail with reference to FIG. 3.

A catholyte containing an aqueous solution of ammonium nitrate to be electrolytically reduced in an electrolytic cell 42 is recycled between a catholyte reservoir tank 43 and the electrolytic cell 42, and is continuously subjected to electrolytic reduction until the ammonium nitrite concentration reaches a predetermined level. The electrolytic cell 42 is separated into an anode chamber and a cathode chamber by a cation exchange membrane, and an anolyte composed of an aqueous solution of a mineral acid is recycled between an anolyte reservoir tank 41 and the electrolytic cell 42 by means of a pump (not shown) or the like. This electrolytic reduction system is substantially the same as the system described hereinbefore with reference to FIG. 1. The catholyte in which the nitrite ion concentration is elevated to a predetermined level is transferred to an electrolyzed liquid reservoir tank 44 by means of a pump (not shown) or the like. The electrolyzed catholyte is then fed to a thermal decomposition column 45 and heated at a temperature of up to the boiling point of the aqueous solution to decompose ammonium nitrite to nitrogen and water. Ammonia contained in the catholyte is recovered in the form of aqueous ammonia by cooling and stored in an ammonia tank 48. This ammonia includes ammonium hydroxide added for the pH adjustment at the electrolytic reduction and ammonia formed as a by-product at the electrolytic reduction. Unreduced ammonium nitrate is contained in the thermally decomposed solution coming from the thermal decomposition column 45. Water formed by the thermal decomposition, water which has permeated from the anode chamber and water for the adjustment of the concentration are removed from this solution by distillation, and the residual liquid is fed to a pH adjusting tank 49 through a heat exchanger 46 by means of a pump (not shown) or the like. At this point, the starting material in an amount corresponding to the amount of reduced and decomposed ammonium nitrate is supplied to the liquid from a starting material tank 47. When the pH value is adjusted in the pH adjusting tank 49, ammonium hydroxide recovered by evaporation in the thermal decomposition column 45 is fed from the ammonia tank 48 and used for the pH adjustment. Thus, the pH value of the liquid is adjusted to a predetermined level suitable for the electrolytic reduction. Then, the liquid is passed through a filter or ultrafiltration system 50 to remove precipitates composed of hydroxides and the like. The majority of metal ions contained in the liquid are conveniently precipitated at a pH value of at least 7, which is ordinarily adopted for the electrolytic reduction. The filtered liquid, that is, the catholyte, is transferred to a thermally decomposed liquid reservoir tank 51 and is recycled to the electrolytic cell 42 for the electrolytic reduction. When the electrolysis is carried out under a certain predetermined pH condition, an acid supply tank 52 is installed to supply nitric acid in an amount corresponding to the amount of formed ammonium hydroxide. It is preferred that the foregoing operations be conducted repeatedly under such conditions that the current efficiency can be maintained at as high a level as possible.

The present invention will now be described more in detail by reference to the following Examples, that by no means limit the scope of the invention. In these Examples, a direct current was used for the electrolysis, the compositions of the produced gases were determined according to gas chromatography and the amounts of the gases were measured by using a wet type gas meter. Generally, water is formed during the electrolytic reduction and water is permeated into the catholyte from the anode chamber during the electrolytic reduction. Accordingly, the concentration of the catholyte solution before the electrolytic reduction was different from the concentration after the electrolytic reduction.

EXAMPLE 1

A highly acidic cation exchange membrane composed of a fluorinated polymer having sulfonic acid exchange groups was used as the ion exchange membrane, an electrode prepared according to the method disclosed in Example 1 of U.S. Pat. No. 4,005,004 was used as the anode and a lead electrode was used as the cathode. In an anode chamber of an electrolytic cell of the clamping type (having a membrane area of 0.3 dm$^2$/cell) provided with the above-mentioned membrane, anode and cathode, an aqueous solution containing 31.5 g/l of nitric acid was fed at a flow rate of 22.8 l/hr. Simultaneously, an aqueous solution containing 230 g/l of sodium nitrate and 3.8 g/l of sodium hydroxide (the pH value being 12.9) was fed to a cathode chamber of the electrolytic cell at a flow rate of 22.8 l/hr. An electric current was applied to the electrolytic cell at a current density of 30 A/dm$^2$, for 2 hours, while maintaining the liquid temperature at 40° C. In the normal steady operation, oxygen gas was formed on the anode, and formation of a small quantity of the gas and coloration of the aqueous solution to a slightly yellowish hue were observed in the cathode chamber. The amount of oxygen generated on the anode was 0.167 mol, and the gas generated on the cathode comprised 0.0181 mol of nitrogen, 0.0034 mol of nitrogen monoxide and 0.0005 mol of hydrogen. The electrolyzed catholyte comprised 194 g/l of sodium nitrate, 17.7 g/l of sodium nitrite, 5.2 g of sodium hydroxide and 0.8 g/l of ammonium hydroxide. The current efficiency for fomation of sodium nitrite was 76.7%.

EXAMPLE 2

In an anode chamber of an electrolytic cell of the clamping type (having a membrane area of 0.3 dm$^2$/cell) provided with a highly acidic cation exchange membrane composed of a styrene-divinylbenzene copolymer having sulfonic acid groups introduced therein, an anode composed of a platinum plate and a cathode composed of lead, an aqueous solution containing 18.3 g/l of hydrochloric acid was fed at a flow rate of 22.8 l/hr, and an aqueous solution containing 230 g/l of sodium nitrate and 3.8 g/l of sodium hydroxide (the pH value being 12.9) was simultaneously fed to a cathode chamber of the electrolytic cell at a flow rate of 22.8 l/hr. The electrolytic reduction was carried out in the same manner as described in Example 1. Other conditions were the same as those adopted in Example 1. The sodium nitrite concentration in the electrolyzed catholyte was 16.3 g/l and the current efficiency for formation of sodium nitrite was 70.5%. Chlorine gas was generated in the anode chamber.

EXAMPLE 3

The electrolytic reduction was carried out under the same conditions as described in Example 2, except that an aqueous solution containing 24.5 g/l of sulfuric acid was used as the anolyte. The sodium nitrite concentration in the electrolyzed catholyte was 16.6 g/l and the current efficiency for formation of sodium nitrite was 72.0%.

EXAMPLE 4

In an anode chamber of an electrolytic cell of the clamping type (having a membrane area of 1.0 dm²/cell) provided with a weakly acidic cation exchange membrane of a fluorinated polymer having carboxyl groups, which was prepared according to the method disclosed in U.S. Pat. No. 4,151,053, an anode having the same composition as that of an electrode of Run No. 4 prepared according to the method disclosed in Example 2 of U.S. Pat. No. 4,005,004 and a cathode composed of lead, an aqueous solution containing 6.3 g/l of nitric acid was fed at a flow rate of 75.2 l/hr, and an aqueous solution containing 400 g/l of sodium nitrate (the pH value being 5.2) was simultaneously fed to a cathode chamber of the electrolytic cell at a flow rate 75.2 l/hr. An electric current was applied to the electrolytic cell at a current density of 30 A/dm², for 2 hours, while maintaning the liquid temperature at 90° C. In the normal steady operation, oxygen gas was formed on the anode, and formation of a small quantity of the gas and slight yellowing of the aqueous solution were observed in the cathode chamber.

The amount of oxygen gas generated on the anode was 0.559 mol, and the gas generated on the cathode comprised 0.050 mol of nitrogen, 0.027 mol of nitrogen monoxide and 0.042 mol of hydrogen. The electrolyzed catholyte comprised 309 g/l of sodium nitrate, 50.5 g/l of sodium nitrite, 6.0 g/l of sodium hydroxide and 0.9 g/l of ammonium hydroxide. The current efficiency for formation of sodium nitrite was 65.1%.

EXAMPLES 5 THROUGH 9

In an anode chamber of an electrolytic cell provided with the same cation exchange membrane as used in Example 1, an anode prepared according to the method described in Example 4 of U.S. Pat. No. 4,005,004 and a cathode composed of indium, an aqueous solution containing 31.5 g/l of nitric acid was fed at a flow rate of 20 l/hr, and an aqueous solution containing 230 g/l of sodium nitrate and 3.8 g/l of sodium hydroxide (the pH value being 12.9) was simultaneously fed to a cathode chamber of the electrolytic cell at a flow rate of 20 l/hr. The electrolytic reduction was carried out under the same conditions as adopted in Example 1.

Furthermore, the electrolytic reduction was repeated in the same manner as described above by using a platinum-plated titanium electrode, a carbon electrode, a mercury electrode and an electrode of a lead-tin alloy (the tin content being 10% by weight) instead of the indium cathode.

In each run, the concentration of sodium nitrite in the electrolyzed catholyte and the current efficiency for formation of sodium nitrite were measured to obtain the results shown in Table 1.

TABLE 1

| Example No. | Cathode Material | Sodium Nitrite Concentration (g/l) | Current Efficiency (%) |
|---|---|---|---|
| 5 | indium | 15.7 | 68 |
| 6 | platinum-plated titanium | 3.2 | 14 |
| 7 | carbon | 9.2 | 40 |
| 8 | mercury | 19.2 | 83 |
| 9 | lead-tin alloy | 16.8 | 73 |

EXAMPLES 10 THROUGH 16

In an anode chamber of an electrolytic cell of the clamping type (having a membrane area of 1 dm²/cell) provided with the same cation exchange membrane as used in Example 1, an anode prepared according to the method disclosed in Example 5 of U.S. Pat. No. 4,005,004 and a cathode composed of tin, an aqueous solution containing 31.5 g/l of nitric acid was supplied at a flow rate of 50 l/hr, and an aqueous solution containing 217 g/l of ammonium nitrate was simultaneously fed to a cathode chamber of the electrolytic cell. An electrolytic current was applied to the electrolytic cell at a current density of 30 A/dm², for 2 hours, while maintaining the liquid temperature at 40° C. during the electrolysis. The pH value was maintained at a level indicated in Table 2 by continuously feeding a minute amount of nitric acid to the cathode chamber. In the normal steady operation, oxygen gas was generated on the anode, and a small amount of the gas was generated on the cathode.

The ammonium nitrite concentration in the electrolyzed catholyte and the current efficiency for formation of ammonium nitrite were measured to obtain the results shown in Table 2.

TABLE 2

| Example No. | pH of Catholyte | Ammonium Nitrite Concentration (g/l) | Current Efficiency (%) |
|---|---|---|---|
| 10 | 4 | 8.5 | 40 |
| 11 | 4.8 | 9.4 | 44 |
| 12 | 6 | 10.4 | 49 |
| 13 | 7 | 11.5 | 54 |
| 14 | 8 | 13.0 | 61 |
| 15 | 9 | 14.9 | 70 |
| 16 | 9.7 | 16.4 | 77 |

EXAMPLE 17

In an anode chamber of an electrolytic cell provided with the same cation exchange membrane as used in Example 1, a rhodium-plated titanium anode and a lead cathode, an aqueous solution containing 31.5 g/l of nitric acid was supplied at a flow rate of 30 l/hr, and an aqueous solution containing 187 g/l of lithium nitrate and 2.4 g/l of lithium hydroxide (the pH value being 13) was simultaneously fed to a cathode chamber of the electrolytic cell at a flow rate of 30 l/hr. An electric current was applied to the electrolytic cell at a current density of 10 A/dm², for 6 hours, while maintaining the liquid temperature at 70° C. during the electrolysis. In the normal steady operation, oxygen gas was generated on the anode, and a small amount of the gas was formed on the cathode.

The nitrite concentration in the electrolyzed catholyte was 12.3 g/l and the current efficiency for formation of the nitrite was 68%.

EXAMPLE 18

The electrolytic reduction was carried out in the same manner as described in Example 17, except that an aqueous solution containing 274 g/l of potassium nitrate and 5.6 g/l of potassium hydroxide (the pH value being 13) was fed to the cathode chamber instead of the aqueous solution of lithium nitrate and lithium hydroxide used in Example 17. The nitrite concentration in the electrolyzed catholyte was 24.0 g/l and the current efficiency for formation of the nitrite was 81%.

EXAMPLE 19

Electrolytic reduction and thermal decomposition were conducted according to the process shown in the flow sheet of FIG. 3.

An aqueous solution containing 217 g/l of ammonium nitrate and 0.35 g/l of ammonium hydroxide was fed to a cathode chamber of an electrolytic cell 42 (having a current-applied area of 3 dm$^2$), and the electrolytic reduction was carried out for 2 hours, while continuously feeding nitric acid in an amount of 0.54 equivalent weight, which is sufficient to neutralize ammonium hydroxide that is formed as a by-product.

An electrolytic cell of the clamping type, which was separated into cathode and anode chambers by a strongly acidic cation exchange membrane composed of a fluorinated copolymer having sulfonic acid exchange groups introduced therein, was used as the electrolytic cell. An aqueous solution containing 30 g/l of nitric acid was supplied as the anolyte. The current density was 20 A/dm$^2$. Each of the catholyte and anolyte was fed at a flow rate of 300 l/hr. The electrolyzed catholyte comprised 65.4 g/l of ammonium nitrate, 78.6 g/l of ammonium nitrite and 0.35 g/l of ammonium hydroxide. This solution was fed to a thermal decomposition column 45 at a certain feed rate while maintaining the liquid temperature at 100° C., and the thermal decomposition was conducted for 30 minutes. About 46.9 l of gaseous nitrogen was formed and discharged from the head of the thermal decomposition column 45. The ammonium nitrite concentration in the thermally decomposed solution was lower than the measurement limit according to oxidation-reduction titration. Thus, it was confirmed that ammonium nitrate was decomposed at a decomposition ratio of approximately 100%. The solution left after the thermal decomposition was passed through a vacuum filtering device to remove suspended solids (such as metal hydroxides), and then, the filtrate was returned to the cathode chamber of the electrolytic cell 42 together with a newly supplied solution of ammonium nitrate and was subjected to the electrolytic reduction again.

EXAMPLES 20 THROUGH 22

Electrolytic reduction and thermal decomposition were conducted according to the process shown in the flow sheet FIG. 3.

In a cathode chamber of an electrolytic cell 42 (having a current-applied area of 3 dm$^2$), 3 l of an aqueous solution containing 217 g/l of ammonium nitrate and 22.7 g/l of ammonium hydroxide (the pH value being 9) was supplied and the electrolytic reduction was carried out for 2 hours. The structure of the electrolytic cell, the anolyte, the current density and the flow rates of the catholyte and anolyte were the same as described in Example 19. The resulting electrolyzed catholyte comprised 155.5 g/l of ammonium nitrate, 30.7 g/l of ammonium nitrite and 22.4 g/l of ammonium hydroxide.

Nitric acid was added to 1 l of the recovered solution to adjust the pH value as indicated in Table 3, and the solution was fed to a thermal decomposition column 45 and the thermal decomposition was carried out for 30 minutes, while maintaining the liquid temperature at 100° to 102° C. During the thermal decomposition, generation of nitrogen and 0.63 equivalent of ammonia from the head of the thermal decomposition column was observed. The amount of nitrogen generated by the thermal decomposition and the percentage thermal decomposition were determined to obtain the results shown in Table 3.

TABLE 3

| Example No. | pH of Solution at Start of Thermal Decomposition | Amount (l) of Nitrogen Generated (as measured at 20° C.) | Percentage Decomposition |
|---|---|---|---|
| 20 | 8.7 | 2.9 | 25.4 |
| 21 | 7.8 | 9.5 | 82.0 |
| 22 | 7.0 | 11.5 | 100 |

EXAMPLES 23 THROUGH 25

Electrolytic reduction and thermal decomposition were conducted according to the process shown in the flow sheet of FIG. 3.

An electrolytically reduced catholyte comprising 251 g/l of ammonium nitrate, 14 g/l ammonium nitrite and 2.5 g/l of ammonium hydroxide and having a pH value of 7.9 was fed to a thermal decomposition column 45, and the thermal decomposition was conducted for 30 minutes, while maintaining the liquid temperature at a level shown in Table 4. The ammonium nitrite concentration in the thermally decomposed solution and the percentage decomposition were determined to obtain the results shown in Table 4.

TABLE 4

| Example No. | Thermal Decomposition Temperature (°C.) | Concentration (g/l) of NH$_4$NO$_2$ | Percentage Decomposition |
|---|---|---|---|
| 23 | 70 | 13.9 | 1 |
| 24 | 80 | 13.0 | 6.8 |
| 25 | 102 | 2.8 | 80.2 |

EXAMPLES 26 TO 33

Electrolytic reduction and thermal decomposition were conducted according to the process shown in the flow sheet of FIG. 3.

About 16 l of an electrolytically reduced catholyte containing 241 g/l of ammonium nitrate, 15.9 g/l of ammonium nitrite and 20.1 g/l of ammonium hydroxide and having a pH value of 8.9, was divided and separately fed to small-size thermal decomposition columns, each including a tubular condenser and having a catalyst shown in Table 5 packed therein. In each run, the reduced catholyte was subjected to thermal decomposition at a temperature of 102° C., without performing the pH adjustment. For comparison, the thermal decomposition was conducted in a catalyst-free system.

The ammonium nitrite concentration in the solution thermally decomposed for 2 hours and the percentage of decomposition was determined to obtain the results shown in Table 5.

TABLE 5

| Example No. | Thermal Decomposition Catalyst | Concentration (g/l) of $NH_4NO_2$ | Percentage Decomposition |
|---|---|---|---|
| 26 | not added | 12.0 | 24.5 |
| 27 | .5% by weight of platinum supported on granular carbon | 9.5 | 40.3 |
| 28 | 2% by weight iridium supported on carbon powder | 10.7 | 32.7 |
| 29 | 2% by weight of ruthenium supported on carbon powder | 8.7 | 45.2 |
| 30 | 2% by weight of iridium-platimum (1:1) supported on carbon powder | 9.7 | 39.0 |
| 31 | Zeolite 5A | 10.3 | 35.2 |
| 32 | active carbon | 10.9 | 31.4 |
| 33 | activated alumina | 11.1 | 30.2 |

EXAMPLE 34

Electrolytic reduction and thermal decomposition were carried out according to the process shown in the flow sheet of FIG. 3.

The pH value of a solution containing 217 g/l of ammonium nitrate and about 0.5 g/l each of iron, chromium and uranium was adjusted to 8.8 by using a solution of ammonium hydroxide. Precipitates of metal hydroxides formed in the solution were separated by filtration. The filtrate comprised 215 g/l of ammonium nitrate, 7.8 g/l of ammonium hydroxide, 2 mg/l of iron, 8 mg/l of chromium and 2 mg/l of uranium. Then, 3 l of this solution was fed to an electrolytic cell (having a current-applied area of 1 dm$^2$) and the electrolytic reduction was carried out for 3 hours. The cation exchange membrane, the anolyte, the current density and the feed rates of the catholyte and anolyte were the same as those described in Example 19. The pH value of the electrolyzed catholyte was adjusted to 7.8 by adding nitric acid, and the solution was fed to a thermal decomposition column packed with a composite catalyst containing 1% by weight each of ruthenium and iridium supported on an alumina, and ammonium nitrite contained in the solution was thermally decomposed. Prior to recycling the thermally decomposed solution to the electrolytic cell, the pH value was adjusted to 8.5 by using a solution of ammonium hydroxide, and a solution containing minute amounts of the so formed metal hydroxide precipitate was fed to an ultrafiltration module composed of an acrylic high polymer (manufactured and sold under the tradename "XBL-100" by Asahi Kasei Kogyo) at a flow rate of 29 l/hr. The filtrate was recycled to the electrolytic cell and used as the catholyte.

The ammonium nitrite concentration in the solution fed to the thermal decomposition column was 14.9 g/l and the ammonium nitrite concentration in the thermally decomposed solution was 0.3 g/l. The decomposition ratio was 98%.

The concentrations of metal impurities in the filtrate which had been passed through the ultrafiltration module were less than 0.5 mg/l of iron, less than 1 mg/l of chromium and less than 0.1 mg/l of uranium.

EXAMPLE 35

A solution obtained by conducting filtration separation in the same manner as described in Example 34 was subjected to electrolytic reduction under the same conditions as described in Example 34. The electrolyzed catholyte comprised 182 g/l of ammonium nitrate, 15.4 g/l of ammonium nitrite, 8.7 g/l of ammonium hydroxide and minute amounts of metal salts, and had a pH value of 8.5.

While the above-mentioned solution was continuously fed to an electrolytic cell and the electrolytic reduction was continued, the electrolyzed catholyte was fed to a thermal decomposition column packed with a platinum catalyst (supported on granular carbon) from a catholyte reservoir tank. The thermal decomposition was conducted for 6 hours, during which 38.5 l of nitrogen was generated from the head of the thermal decomposition column. Condensed water obtained from the thermal decomposition column contained ammonia in an amount of about 0.7 equivalent weight as a whole.

The pH value of the solution which had been passed through the thermal decomposition column was 7.7. This solution was cooled and the pH value of the solution was adjusted to 8.5 by using ammonium hydroxide. This solution was recycled to the cathode chamber of the electrolytic cell. The ammonium nitrate concentration in the electrolytically reduced and thermally decomposed solution was 126 g/l.

What we claim is:

1. A process for the decomposition of ammonium nitrate, comprising supplying an aqueous solution containing ammonium nitrate as a catholyte into a cathode chamber of an electrolytic cell including cathode and anode chambers separated by a cation exchange membrane, subjecting the solution to electrolytic reduction while maintaining the pH of the solution at a value above about 4, thermally decomposing the electrolytically reduced catholyte outside the electrolytic cell and removing formed nitrogen and water from the reaction system.

2. A process for the decomposition of ammonium nitrate according to claim 1, wherein the residual solution left after removal of formed nitrogen and water is recycled to the electrolytic cell.

3. A process for the decomposition of ammonium nitrate according to claim 1, wherein the pH value of the catholyte is adjusted to a value not higher than about 9 prior to the thermal decomposition.

4. A process for the decomposition of ammonium nitrate according to claim 1, wherein the thermal decomposition is carried out at a temperature higher than the temperature adopted for the electrolytic reduction.

5. A process for the decomposition of ammonium nitrate according to claim 1, wherein the thermal decomposition is carried out in the presence of at least one catalyst selected from the group consisting of platinum group metals, active carbon, activated alumina and alumina silicate, thereby to promote the thermal decomposition.

6. A process for the decomposition of ammonium nitrate according to claim 1, wherein prior to supply of the aqueous solution containing ammonium nitrate to the electrolytic cell, the pH value of the aqueous solution is adjusted so that metal compounds and other impurities contained in the aqueous solution are precipitated, and said impurities are removed as much as possible.

7. A process for the decomposition of ammonium nitrate according to claim 6, wherein an ultrafiltration module composed of a synthetic high polymer membrane is used to separate and remove fine colloidal particles.

8. A process for the decomposition of ammonium nitrate according to claim 1, wherein said electrolytic reduction is carried out at a temperature of from about 15° to about 70° C., and said thermal decomposition is carried out at a temperature of about 70° C. or higher.

9. A process for the decomposition of ammonium nitrate, comprising supplying an aqueous solution containing ammonium nitrate as a catholyte into a cathode chamber of an electrolytic cell including cathode and anode chambers separated by a cation exchange membrane, subjecting the solution to electrolytic reduction while maintaining the pH of the solution at a value above about 4, thermally decomposing the electrolytically reduced catholyte outside the electrolytic cell, the pH value of said catholyte being adjusted to a value not higher than about 9 prior to the thermal decomposition, removing formed nitrogen and water from the reaction system, and, after removal of formed nitrogen and water, recycling the residual solution to the electrolytic cell.

10. A process for the decomposition of ammonium nitrate according to claim 9, wherein the thermal decomposition is carried out at a temperature higher than the temperature adopted for the electrolytic reduction.

11. A process for the decomposition of ammonium nitrate according to claim 9, wherein the thermal decomposition is carried out in the presence of at least one catalyst selected from the group consisting of platinum group metals, active carbon, activated alumina and alumina silicate, thereby to promote the thermal decomposition.

12. A process for the decomposition of ammonium nitrate according to claim 9, wherein prior to supply of the aqueous solution containing ammonium nitrate to the electrolytic cell, the pH value of the aqueous solution is adjusted so that metal compounds and other impurities contained in the aqueous solution are precipitated, and said impurities are removed as much as possible.

13. A process for the decomposition of ammonium nitrate according to claim 12, wherein an ultrafiltration module composed of a synthetic high polymer membrane is used to separate and remove fine colloidal particles.

14. A process for the decomposition of ammonium nitrate comprising:
adjusting the pH value of an aqueous solution containing ammonium nitrate so that metal compounds and other impurities contained in the aqueous solution are precipitated, and said impurities are removed as much as possible;
separating and removing fine colloidal particles by utilizing an ultrafiltration module composed of a synthetic high polymer membrane;
supplying the thereby obtained aqueous solution containing ammonium nitrate as a catholyte into a cathode chamber of an electrolytic cell including cathode and anode chambers separated by a cation exchange membrane;
subjecting the solution to electrolytic reduction while maintaining the pH of the solution at a value above about 4; and
thermally decomposing the electrolytically reduced catholyte outside the electrolytic cell and removing formed nitrogen and water from the reaction system.

15. A process for the decomposition of ammonium nitrate according to claim 14, wherein the residual solution left after removal of formed nitrogen and water is recycled to the electrolytic cell.

16. A process for the decomposition of ammonium nitrate according to claim 14, wherein the pH value of the catholyte is adjusted to a value not higher than about 9 prior to the thermal decomposition.

17. A process for the decomposition of ammonium nitrate according to claim 14, wherein the thermal decomposition is carried out at a temperature higher than the temperature adopted for the electrolytic reduction.

18. A process for the decomposition of ammonium nitrate according to claim 14, wherein the thermal decomposition is carried out in the presence of at least one catalyst selected from the group consisting of platinum group metals, active carbon, activated alumina and alumina silicate, thereby to promote the thermal decomposition.

* * * * *